United States Patent [19]

Tominaga

[11] Patent Number: 4,958,285
[45] Date of Patent: Sep. 18, 1990

[54] NATURAL LANGUAGE PROCESSING SYSTEM

[75] Inventor: Masasuke Tominaga, Kawasaki, Japan

[73] Assignee: Hitachi, Ltd., Tokyo, Japan

[21] Appl. No.: 201,998

[22] Filed: Jun. 3, 1988

[30] Foreign Application Priority Data

Jun. 5, 1987 [JP] Japan ............... 62-141108

[51] Int. Cl.$^5$ ............... G06F 15/38
[52] U.S. Cl. ............... 364/419; 364/200; 364/226.4; 364/900; 364/920.4
[58] Field of Search ............... 364/419, 226.4, 920.4

[56] References Cited

U.S. PATENT DOCUMENTS

| | | | |
|---|---|---|---|
| 4,502,128 | 2/1985 | Okajima et al. | 364/419 X |
| 4,586,160 | 4/1986 | Amano et al. | 364/419 X |
| 4,641,264 | 2/1987 | Nitta et al. | 364/900 |

Primary Examiner—Jerry Smith
Assistant Examiner—Steven Kibby
Attorney, Agent, or Firm—Pennie & Edmonds

[57] ABSTRACT

A natural language processing system for processing an original text by applying grammar rules, includes a grammar rule control table for holding information on applicability of the grammar rules to the original text, the information containing dictionary information associated with words appearing in the original text, and means for determining application or non-applicability application of each grammar rule based on the applicability information. The application conditions for applying each grammar rule are collectively evaluated or examined based on the information on the applicability of the grammar rules contained in the dictionary information and information on the text type, sentence type and domain of subject of the original text, and the result is stored in the grammar rule control table.

11 Claims, 3 Drawing Sheets

FIG. 4

| ENTRY | SO | THAT |
|---|---|---|
| ID OF ACTIVATED GRAMMAR RULE | 1 | 1 |
| FLAG NO. | 1 | 2 |
| PART OF SPEECH | ADV | CONJ |
| SYNTACTIC INFORMATION | — | — |
| SEMANTIC INFORMATION | — | — |
| ⋮ | ⋮ | ⋮ |

| ID OF GRAMMAR RULE | ACTIVATION FLAGS | | | POINTER |
|---|---|---|---|---|
| 1 | 1 | 1 | ... | 10 |
| 2 | 1 | 0 | ... | 20 |
| 3 | 0 | 0 | ... | 30 |
| ⋮ | ⋮ | ⋮ | ⋮ | ⋮ |

35

GRAMMAR RULE if ~ then ~
⋮

41

NATURAL LANGUAGE PROCESSING SYSTEM

BACKGROUND OF THE INVENTION

The present invention relates to a natural language processing system, and more particularly to a natural language processing system which involves efficient grammatical rule application processing by limiting grammar rules to those which are previously applicable in accordance with an original text.

A conventional natural language processing apparatus comprises a dictionary and grammar rules for an object language, and a processor for applying the grammar rules.

In the field of natural language processing, both natural language question-answering systems and machine translation systems have been, studied and developed. In order to improve the quality of the process result of translation in the machine translation system, the processing is changing from syntax based processing to semantics based processing, and the amount of dictionary information and processing rules required is increasing significantly.

In order to effectively utilize the huge volume of information, the dictionary may be filed in separate files by domain of subject of the original text and they may be selectively used, or a plurality of translation mechanisms may be provided so that they may be selectively used depending on the original text.

The grammar rules may be grouped by the details of processing and processing details, and the application is controlled for each group to enhance the efficiency of the processing.

A related apparatus is disclosed in JP-A-60-124782, U.S. Pat. No. 4,641,264, and U.S. Ser. No. 61,218 filed June 12, 1987, entitled "Method and System for Language Translation" assigned by the present assignee.

In the prior art, the dictionary or grammar rules are divided by utilizing the characteristic feature of the text and are then selectively used to enhance the efficiency of the processing or, effect the processing suitable to the original text. However, this is not successful because it is difficult to divide the dictionary or grammar rules by the text type, sentence type or domain. Furthermore, even if it is possible, it is not sufficient to solve the problem due to the large volume of information required for high quality processing.

In the natural language processing performed by machine translation, it is necessary to save wasteful processing, and thereby enhance the efficiency, by limiting the dictionary information and grammar rules required for processing the text to only those suitable for the original text.

SUMMARY OF THE INVENTION

It is an object of the present invention to provide a natural language processing system which selects only those grammar rules which are suitable for the text to be processed so that the efficiency of processing is enhanced.

The above object of the present invention is achieved in the natural language processing system which applies grammar rules to an original text by utilizing information on applicability of the grammar rules to the original text and determining the application or non-application of the grammar rules based on this information.

In the natural language processing system of the present invention, the application conditions for applying each grammar rule are collectively evaluated (examined) based on the information on the applicability of the grammar rules (defined by the applicable grammar rule information) contained in the dictionary information of the words appearing in the original text along with information on the text type, sentence type, and domain of subject of the original text. The result is stored in a grammar rule control table.

As a result, it is possible to limit the grammar rules applied in the natural language processing to only those grammar rules which are suitable to the original text. Misoperation or wasteful processing is thus prevented and the processing suitable to the text can be effected at a high efficiency. When the number of grammar rules is huge in order to realize sophisticated processing of a language, it is possible to reduce the number of grammar rules necessary for the processing of the original text before the original text is analyzed. Accordingly, it is effective in enhancing the efficiency of processing.

BRIEF DESCRIPTION OF THE DRAWINGS

FIG. 4 shows an information structure of a dictionary of FIG. 2, and FIG. 5 shows a grammar rule control table of FIG. 3.

DESCRIPTION OF THE PREFERRED EMBODIMENTS

Figure 2:
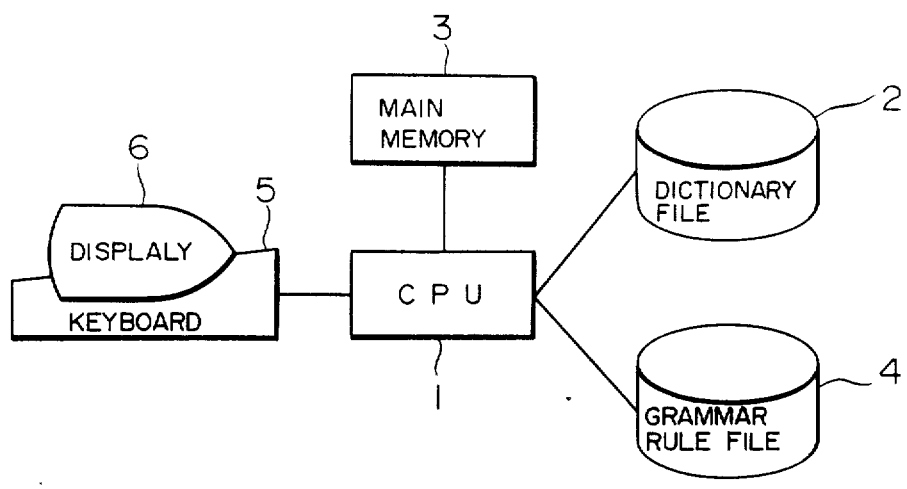
FIG. 2 shows a block diagram of one embodiment of the natural language processing apparatus of the present invention.

FIG. 2 shows a block diagram of one embodiment of the natural language processing apparatus of the present invention. Translation from English to Japanese is considered here. Numeral 1 denotes a CPU, numeral 2 denotes a dictionary file, numeral 3 denotes a main memory having an internal processing table and a processing program, numeral 4 denotes a file for storing grammar rules, numeral 5 denotes a keyboard by which a user enters text information such as an original text, a domain of the original text, text type and sentence type, and numeral 6 denotes a display for monitoring the text information and the processed result of the text.

The text types include newspaper, magazine, technical report, novel and poem. In the present embodiment, the technical report is considered as the example text. Domains of the technical reports include electrical engineering, chemistry, mechanical engineering, architecture, and information engineering. The information engineering domain is considered here. The sentence types include title, abstract, body sentence and reference.

Figure 3:
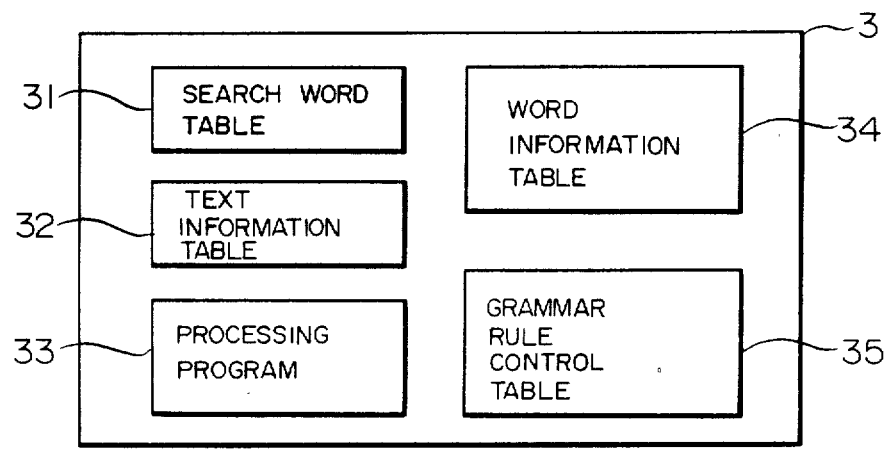
FIG. 3 shows a layout of area allocation in a main memory shown in FIG. 2.

FIG. 3 shows a layout of area allocation of the main memory 3 shown in FIG. 2. In the main memory 3, numeral 31 denotes a search word table for storing words to be searched, numeral 32 denotes a text information table for storing text information such as domain, text type and sentence type of the original text. Numeral 34 denotes a word information table for storing dictionary information of searched words and numeral 35 denotes a grammar rule control table for storing a flag indicating applicability of the grammar rules. A pointer indicates a storage area at which the grammar rules are stored. Numeral 33 denotes a processing program which includes a program for dividing the original text into words and storing them in the search word table 31, a program for searching dictionary information of a word from a dictionary, a program for controlling an activation flag which indicates applicability of the grammar rules in the grammar rule control table 35 based on the applicable grammar rule information in the dictionary information stored in the word information table 34 and the text information in the text information table 32, and a program applied to a text which processes the grammar rules and an interium result thereof.

The processing in the present embodiment is explained.

The present embodiment is applicable to common natural language processing such as machine translation. The processing is done in the following manner.

Before processing, the user enters from the keyboard 5 information inherent to the original text such as text type, sentence type and domain which is stored in the text information table 32. In the present embodiment, the text type is technical report, the domain is information engineering, and the sentence type is body sentence. These may be altered before or during the processing. Also, they may not need not be set, depending on the text.

Figure 1:
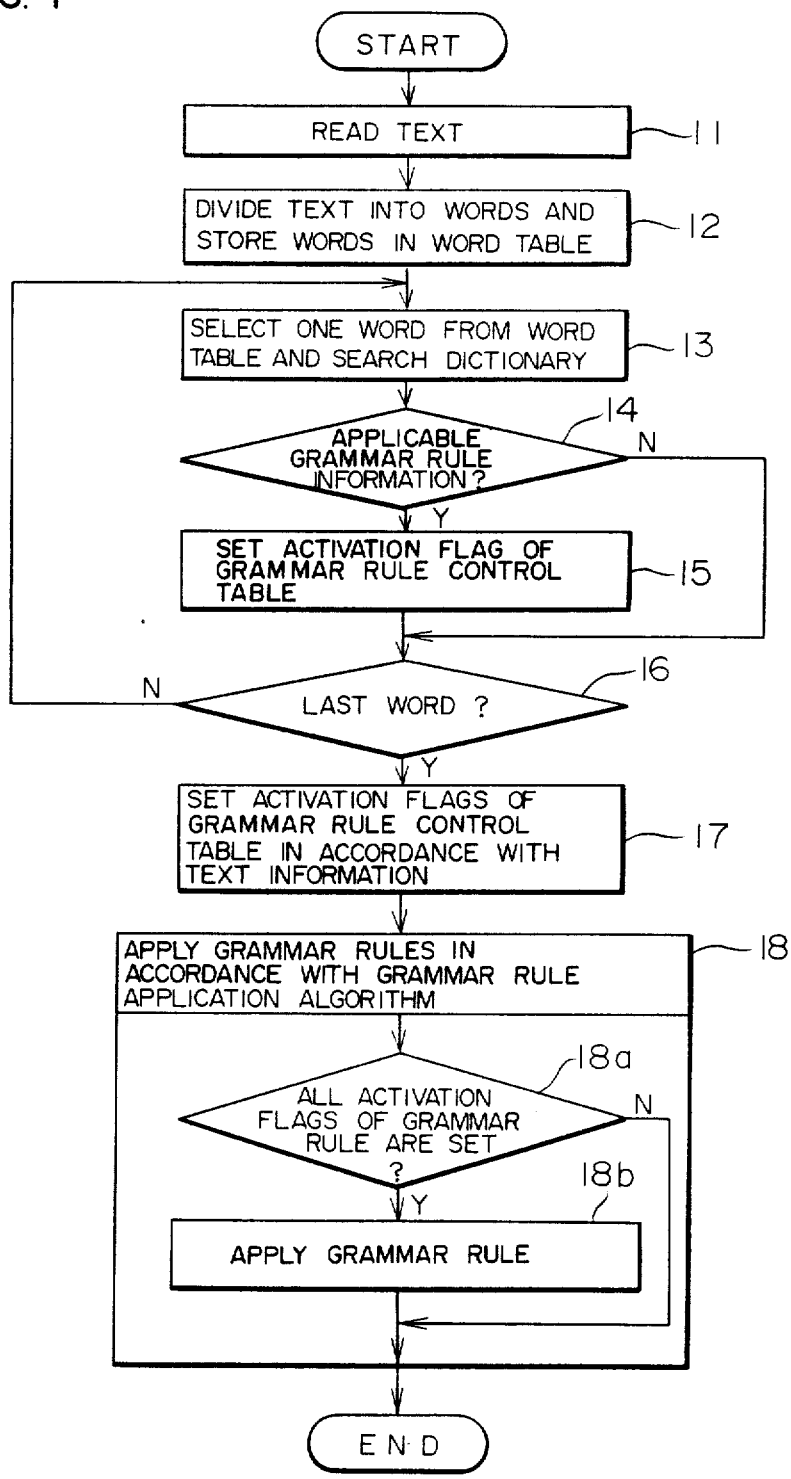
FIG. 1 shows a flow chart of an operation in one embodiment of the present invention.

FIG. 1 shows a flow chart of the processing program used in the present embodiment. The operation is explained with reference to FIG. 1.

The text entered by the operator through the keyboard 5 is divided into words by the CPU 1 and the words are loaded into the search word table 31 in the main memory 3 (steps 11, 12). The CPU 1 then searches the dictionary file 2 by using the words in the search word table 31 as the search keys and loads the searched data into the word information table 34 in the main memory 3 (step 13). The search method for the dictionary file 2 may be a dictionary search method including a morphological processing method which is disclosed in column 9, line 8 to column 12, line 24 of U.S. Pat. No. 4,641,264.

Whether information on the applicability of the grammar rules (see FIG. 4) is included in the dictionary information of the words read into the word information table 34 is checked (step 14). If the applicable grammar rule information is included, a processing program for controlling an activation flag to the grammar rules in the grammar rule control table 35 based on the applicable grammar rule information is stored (step 15).

In the present embodiment, the dictionary information as shown in FIG. 4 and the grammar rule control table 35 as shown in FIG. 5 are used.

The dictionary information shown in FIG. 4 indicates ID's of the grammar rules which are applicable only when the entry words "SO" and "THAT" are present in the text, and the numbers of the activation flags of the grammar rules which are to be set. Other common dictionary information on the entry words such as parts of speech, syntactic information and semantic information necessary for processing the text are also included. Dictionary information other than the applicable grammar rule information is not specified in the present invention.

When the control program for the grammar rule control table 35 is started, the corresponding grammar rule activation flag in the grammar rule control table 35 is set in accordance with the applicable grammar rule information in the dictionary information shown in FIG. 4 (step 15). This indicates that at least one of conditions under which the grammar rule is applied is met. In the dictionary information shown in FIG. 4, only one set of applicable grammar rule information is included, although a plurality of sets of information may be included. The activation flags for all grammar rules which are applicable only when the word corresponding to the entry word appears in the text are set.

In the grammar rule control table shown in FIG. 5, the activation flags which indicate the applicability of the grammar rules and the pointers which point the storage areas in which the grammar rules 41 are stored are shown for each ID of the grammar rules. The activation flags indicate success or failure status of at least one of conditions under which the grammar rules are to be applied. The vertical column of the activation flags need not represent the same condition for each grammar rule. As many flags for indicating the success or failure status as the number of conditions for activating each grammar rule are provided for each ID of the grammar rules. Only the grammar rules whose flags are set are applicable.

The above dictionary search and grammar rule activating process is repeated for each of the words stored in the search word table 31 of FIG. 3 (step 16). Then, the grammar rules which are applied only when the specified text types, the specified sentence type or the specified domain is processed are activated in accordance with the text information in the text information table 32 (step 17) in the same manner as the activation of the grammar rules based on the word dictionary information.

In the present embodiment, when the grammar rule control table 35 of FIG. 5 is used, the numbers of the activation flags are determined in accordance with the preclassified text types, the sentence type and domains. In the activating process all flag numbers corresponding to the text types, the sentence type and the domain designated by the text information are set. For those grammar rules which are always applicable irrespective of the text type, the corresponding activation flags may be previously set, or only those grammar rules whose applicability may change depending on the word or text information appearing in the text may be controlled by the grammar rule control table 35.

In this manner, only those grammar rules which are to be used for processing the input text are activated in the grammar rule control table. After the dictionary search and grammar rule activating process, the application program for processing the text with the grammar rules is started (step 18). In the application process of the grammar rules, whether or not the grammar rules to be applied have been activated or not is checked based on the grammar rule control table (step 18a).

In the grammar rule control table 35 of the present embodiment shown in FIG. 5, the activation flags corresponding to each grammar rule which indicate the success or failure status of the conditions under which the corresponding grammar rule is applicable are checked. If the grammar rules have been activated, they are applied to text processing (step 18b). For example, when the dictionary is searched, the words "SO" and "THAT" shown in FIG. 4 are accessed and the corresponding dictionary information is loaded into the word information table 34. Then, the ID No. 1 of the grammar rules is activated by the activating process. This is a grammar rule to analyze a usage "SO - THAT" in the English text and it is applicable only when the two words "SO" and "THAT" are present in the text. Unnecessary grammar rules which have not been activated in the activating process following the dictionary search process are excluded so that the repetition of wasteful application of the grammar rules is prevented.

By repeating the above process, the application program of the grammar rules is executed. Details of the application algorithm of the grammar rules differs depending on the object of processing of the text. In the present invention, the grammar rules to be applied are limited to those activated rules which are indicated by the grammar rule control table.

The activating process for the grammar rules may be effected, not only statically based on the information on the words appearing in the text and the text information such as text type, sentence type and domain, but also dynamically. This is done by introducing the activating operation of other grammar rules into the original grammar rules in accordance with an interior result of the processing. In accordance with such activating process of the grammar rules, only the grammar rules suitable for the text to be processed are activated so that the grammar rules to be applied may be limited to those activated and the processing suitable for the text can be efficiently achieved.

A unit to be activated need not be limited to a grammar rule but it may be expanded to a group of grammar rules for related processing.

In accordance with the present invention, in a natural language processing system for processing an input text by applying grammar rules, information on the applicability of the grammar rules to the input text is set in the dictionary information and the internal processing table and the applicability of the grammar rules is determined based on the applicability information. Since only those grammar rules suitable for the text to be processed are selected, the natural language processing is achieved efficiently.

I claim:

1. A natural language processing system for processing an original text by applying grammar rules, comprising:
   input means to input a text;
   means for setting applicability data which corresponds to the applicability of said grammar rules and which indicates whether individual grammar rules can contribute to the processing of the original text;
   means responsive to the input text for providing information on applicability of grammar rules from said setting means; and
   selecting means coupled to said information providing means for selecting one or more from among said plurality of grammar rules, only said selected rules to be used for processing said input text, said selection based on said provided information on applicability of grammar rules, and said selection performed before applying said grammar rules to said input text.

2. A natural language processing system according to claim 1 wherein said applicability data includes dictionary information associated with words appearing in the original text.

3. A natural language processing system according to claim 1 wherein said applicability data includes dictionary information associated with words appearing in the original text and information on text type, sentence type and domain of the original text.

4. A natural language processing system comprising:
   a plurality of one or more grammar rules;
   means for inputting information of an original text;
   a dictionary memory containing syntactic and semantic information of words for a natural language corresponding to the original text, and further containing for said words information indicative of the applicability of said grammar rules;
   a main memory for storing a processing table and a processing program;
   a file for storing said grammar rules; and
   a central processing unit for dividing the input original text into words, loading the words into the processing table, searching said dictionary memory by using said words as search keys, and when the dictionary information of the searched word includes the information on applicability of one or more among said grammar rules stored in said file, determining applicability of the grammar rules based on said information on applicability, processing the input original text by using a set of applicable grammar rules in accordance with the processing program stored in said main memory.

5. A natural language processing system according to claim 4 further comprising means for displaying information including said input text, said dictionary information searched during the processing of said input text, said determined applicability of said grammar rules as applied during the processing, and the information which results from using said set of applicable grammar rules.

6. A natural language processing system according to claim 4 wherein said main memory includes as said processing tables, a first table for storing the searched words, a second table for storing information of the original text, a third table for storing searched dictionary information of the words, and a fourth table for storing flags indicating the applicability of the grammar rules and information of a pointer pointing a storage area in which the grammar rules are stored.

7. A natural language processing system according to claim 4 wherein said central processing unit translates one natural language to another natural language.

8. A natural language processing system according to claim 4 wherein the information of the input original text includes at least one of text type, sentence type and domain.

9. A natural language processing method comprising the steps of:
   reading information of an original text;
   dividing the input original text into words and storing the words in a search word table;
   selecting one of the words in the search word table, searching a dictionary memory by using the selected word as a search key, and storing searched dictionary information in a word information table;
   determining whether information on applicability of grammar rules is included in the dictionary information stored in the word information table;
   when the information on the applicability of the grammar rules is included, starting a processing program for controlling activating flags to each of the grammar rules stored in a grammar rule control table in accordance with applicable grammar rule information;
   when the information on the applicability of the grammar rules is not included, skipping the start step of the processing program;

executing the above steps for each of other words in the search word table;

activating the grammar rules in the grammar rule control table in accordance with the information of the original text; and processing the original text in accordance with a predetermined application algorithm of the grammar rules by taking a result of the activating process of the grammar rules into account.

10. A natural language processing method according to claim 9 wherein the information of the input original text includes at least one of text type, sentence type and domain.

11. A natural language processing method according to claim 9 wherein the processing step translates one natural language to another natural language.

* * * * *